United States Patent [19]

Kawasaki et al.

[11] 3,824,546

[45] July 16, 1974

[54] PATTERN RECOGNIZING SYSTEMS

[75] Inventors: Harumi Kawasaki; Tohru Nakajima, both of Tokyo, Japan

[73] Assignee: Apahi Kogaku Kogyo Kabushiki Kaisha, Tokyo-to, Japan

[22] Filed: Jan. 14, 1973

[21] Appl. No.: 324,362

[30] Foreign Application Priority Data

Jan. 22, 1972 Japan .................................. 47-8467

[52] U.S. Cl. ........................... 340/146.3 F, 250/567

[51] Int. Cl. ............................................ G06k 9/12

[58] Field of Search ............ 250/219 CR, 556, 567; 356/71; 340/146.3 F, 146.3 G, 146.3 P, 146.3 R

[56] References Cited

UNITED STATES PATENTS

| | | | |
|---|---|---|---|
| 3,104,369 | 9/1963 | Rabinow et al. | 340/146.3 MA |
| 3,159,814 | 12/1964 | Rabinow | 340/146.3 F |
| 3,160,854 | 12/1964 | Gregory | 340/146.3 F |
| 3,292,148 | 12/1966 | Giuliand et al. | 340/146.3 G |

*Primary Examiner*—Paul J. Henon
*Assistant Examiner*—Leo H. Boudreau
*Attorney, Agent, or Firm*—Steinberg & Blake

[57] ABSTRACT

A system for recognizing and identifying patterns in the form of letters, numerals, and the like. An image-forming structure is provided for forming an image of a pattern, which is to be recognized, in each of a pair of image planes. This image-forming means has an optical axis, and a positioning structure is operatively connected with a pattern carrier for moving the latter across the latter optical axis in order to locate patterns, which are carried by the pattern carrier and which are to be recognized, sequentially at a read position extending across the optical axis. A pair of photosensitive units are respectively situated in the regions of the above image planes for responding to an image at the latter planes and for respectively detecting characteristics of the image in a pair of mutually perpendicular directions and then converting these characteristics into a pair of corresponding electrical signals which are respectively indicative of characteristics of a pattern along a pair of mutually perpendicular coordinates. A quantizing assembly is electrically connected with the pair of photosensitive units for quantizing the latter electrical signals into binary codes capable OF identifying the pattern.

12 Claims, 9 Drawing Figures

PATTERN RECOGNIZING SYSTEMS

BACKGROUND OF THE INVENTION

The present invention relates to systems for recognizing patterns so as to be capable of automatically reading patterns such as characters, numerical figures, symbols, or standardized figures.

In recent times various automatic pattern-recognizing systems have become known, with various types of OCR (optical character reader) systems coming into practical use, while, on the other hand, researches are going forward on pattern-recognizing systems according to optical matched filtering techniques which have been previously known as coherent optical information processing. In the former type of system there is no novel optical character reading. The reading is carrier out, for example, by scanning characters, for example, by means of a flying-spot tube or a slit scanning disc, or through a magnetic reading system in MICR. The quantizing and judge logic circuits for readout of characters or figures are exceedingly complex so that normal pattern identification is carried out by an electronic computer structure.

For the above reasons the types of character patterns which can be discriminated are restricted to alphanumeric characters and simple symbols. Furthermore, it is conventional to employ characters which are so standardized as to be capable of recognition both by human beings and machines, such as magnetic ink characters E13B, CMC7, OCR-A, etc. In connection with OCR machines for handwritten characters, there have appeared as character reading systems the sonde system and a method os scanning a character outline by means of a flying-spot tube. Researches are being carried out with respect to judgment of letters of the alphabet by way of quantization of observed parameters with reference to longitudinal and transverse positions of maximums of the pattern curves, presence or absence of loops, positions of cusps, etc. In the recognition of handwritten characters, the number of parameters to be observed is greater than that of printed types of characters, and the quantizing circuit systems are more complex so that at the present time the characters that can be handled in practice are restricted to those of zip codes.

In general with known OCR systems, the optical structure is used merely for illumination and scanning, and there is no optical information processing function such as correlation processing in light filtering. In addition, the logic processing for quantization and identification of pattern information which is observed depends upon soft functions of electronic computers, so that there is the drawback of a requirement of exceedingly expensive apparatus.

On the other hand, in the case of the optical filtering methods, the sole characteristic utilized is simultaneous parallel processing of two-dimensional patterns employing a coherent light source such as a laser. The processing function of the electronic computer is replaced by optical information processing, so that it is possible to carry out a high-density and high-speed pattern identification. The patterns which can be handled by such a holographic system, however, are only negative types of transparent figures such as a microfiche. This method is not suitable for handling immediate input information of positive types of patterns such as printed or typewritten letters. Furthermore, for this latter method certain additional processes are essential such as providing code transformation types of holograms by adding optical codes to input patterns as a means for discriminating with a good SN ratio optical correlation images among resembling characters. For such reasons pattern identification according to optical filtering techniques is at the present time still at the research stage and has not been put to practical use.

SUMMARY OF THE INVENTION

It is accordingly a primary object of the present invention to provide a pattern recognizing system which will avoid the above drawbacks.

In particular, it is an object of the present invention to provide a pattern-recognizing system capable of simultaneously carrying out parallel recognition functions of all parts of a two-dimensional pattern with the optical system itself having the main pattern recognizing function.

More specifically it is an object of the invention to provide an optical system which, instead of directly detecting the pattern itself, simultaneously detects pattern characteristics in a pair of mutually perpendicular directions for achieving signals which can be effectively handled.

Furthermore, it is another object of the present invention to provide a system which can handle patterns which include undeformed normal printed or typewritten letters and the like as well as standardized figures, so that the invention is not restricted to deformed patterns such as especially standardized letters which are essential with conventional OCR systems.

A more specific object of the present invention is to provide a system capable of analyzing two-dimensional patterns in the form of compression images in a pair of mutually perpendicular directions in such a way as to be capable of identifying the input patterns by quantizing photoelectric transformation signals of the light intensity distribution of the compression images, so that in this way it is not necessary to resort to pattern recognition according to holographic methods by detecting correlation images as a result of Fourier transformation of patterns by means of relatively complex optical systems and optical processes.

Thus, it is an object of the present invention to provide a pattern recognizing system which has a relatively simple optical system as well as a relatively inexpensive light source since the system of the invention does not require a coherent optical system as is essential for holographic techniques and since an expensive coherent light source such as a laser is not absolutely essential.

It is furthermore one of the important objects of the present invention to provide a system capable of simultaneously carrying out parallel processing functions of analyzing pattern light intensity compression images with an incoherent optical system capable of performing as well as holographic correlation systems, with the pattern-identifying logic circuit system of the invention being constructed in an exceedingly simple manner so that with the present invention there is elimination of such drawbacks as complex and expensive structures which are essential with conventional OCR systems.

Thus, it is a general object of the present invention to provide a means capable of discriminating arbitrary two-dimensional patterns of both positive and negative type by means of a relatively simple optical means which is capable of carrying out simultaneous parallel processing of two-dimensional information and capable of carrying out quantizing and identification with a simple logic system.

According to the pattern-recognizing system of the invention, an image-forming means is provided for forming an image of a pattern, which is to be recognized, in each of a pair of image planes, this image-forming means having an optical axis. A positioning means is optically connected with a pattern carrier for moving the latter across the optical axis for locating patterns, which are carried by the pattern carrier and which are to be recognized, sequentially at a read position extending across the optical axis. A pair of photosensitive means are respectively situated in the regions of the latter image planes for responding to an image at these planes and for respectively detecting characteristics of the image in a pair of mutually perpendicular directions and for converting these characteristics into a pair of corresponding electrical signals which are respectively indicative of characteristics of the pattern along a pair of mutually perpendicular coordinates. A quantizing means is electrically connected with this pair of photosensitive means for quantizing the electrical signals into binary codes capable of identifying the pattern.

BRIEF DESCRIPTION OF DRAWINGS

The invention is illustrated by way of example in the accompanying drawings which form part of this application and in which.

DESCRIPTION OF PREFERRED EMBODIMENTS

Figure 1:
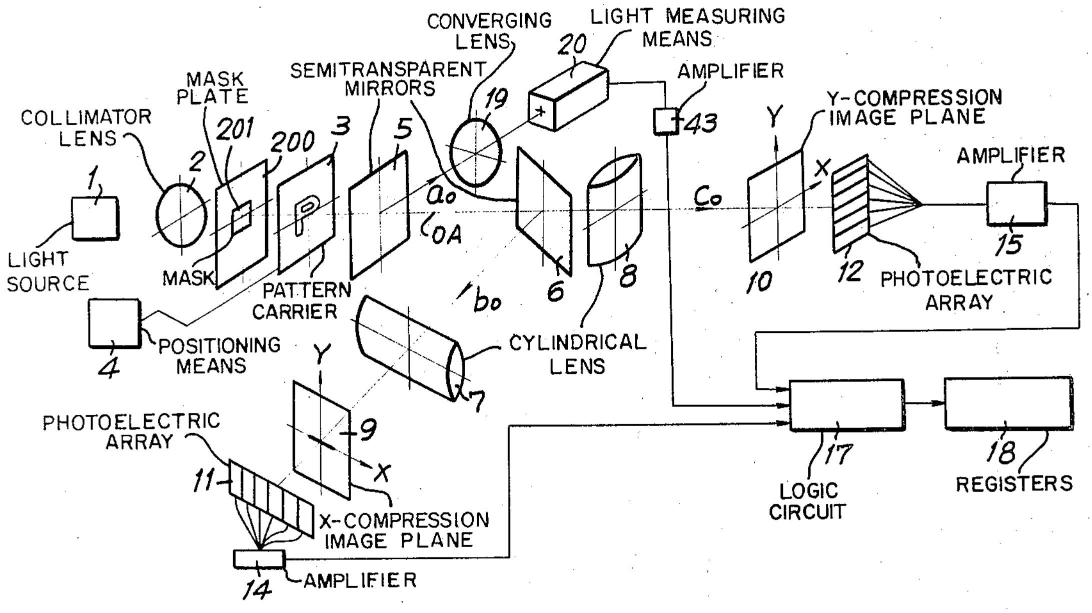
FIG. 1 is a schematic representation of one possible pattern-recognizing system according to the present invention.

FIG. 1 illustrates one example of an optical system and electronic circuitry for recognizing negative types of patterns. A pencil of light rays issue from a light source 1 and is rendered parallel by way of a collimator lens 2 in order to evenly illuminate a pattern carrier in the form of a film 3 which carries a plurality of input patterns one of which is schematically illustrated by "P." In this case the size of the parallel light spot is sufficient to illuminate fully one input pattern. It is not essential that the light source 1 be in the form of a laser which has a coherent nature, but a laser light (for example visible light of He—Ne laser) may be utilized because of its brightness and directivity. The input patterns are two-dimensional patterns such as letters of the alphabet (capital letters and small letters), Chinese characters, kanas (Japanese syllabary), punctuation marks, etc. The light which passes through a pattern which extends across the optical axis OA reaches a semi-transparent mirror 5 to be partially reflected thereby so as to form the reflected light rays $a_o$, while the remaining major part of the light travels through the mirror 5 and reaches a semi-transparent mirror 6. The treatment of the reflected light rays $a_o$ is described below.

The light which reaches the semi-transparent mirror 6 is partially reflected to form the light rays $b_o$ which reach a cylindrical lens 7. The light rays $c_o$ which travel through the mirror 6 reach a cylindrical lens 8 whose axis is oriented perpendicularly with respect to the axis of the cylindrical lens 7. These cylindrical lenses 7 and 8 are of the same configuration and size and are arranged so as to form an X-compression image at the image plane 9 and a Y-compression image at the image plane 10, respectively. Thus, the above-described structure constitutes an image-forming means for forming an image of a pattern carried by the pattern carrier 3 at the pair of image planes 9 and 10. A positioning means 4 of any suitable construction is operatively connected with the pattern carrier 3 in order to move the latter across the optical axis OA so as to locate sequentially the patterns on the carrier 3 at a read position where each pattern extends across the optical axis in a plane perpendicular thereto, and the arrangement is such that the positioning means 4 moves the carrier 3 in a direction which displaces each pattern in the direction of the X-coordinate in which the image appears at the image plane 9. Referring to the upper left portion of FIG. 4, it will be seen that in connection with the illustrated example of a pattern 26 formed by the letter "P," the X-compression image signifies the image of the pattern 26 along the X-axis as illustrated below the pattern 26 in FIG. 4, while the Y-compression image signifies the image of the pattern along the Y-axis as illustrated to the right of the pattern 26 in FIG. 4.

A pair of photosensitive means are respectively situated in the region of the image planes 9 and 10 in order to respond to the images at these planes so as to detect characteristics of the image in a pair of mutually perpendicular directions and so as to provide corresponding electrical signals which are thus indicative of the image at the read position in a pair of mutually perpendicular coordinates. In the example of FIG. 1 this pair of photosensitive means includes the pair of photoelectric element arrays 11 and 12 which are respectively arranged in the horizontal and vertical rows illustrated in FIG. 1 so as to carry out photoelectric detection of the X-compression image at the plane 9 and the Y-compression image at the plane 10, these arrays including distinct series of photoelectric elements which divide the detection into a plurality of segments. The entire length of the photoelectric element array in connection with the X-compression image is determined as follows: In connection with a character group which is to be identified, for example the hiragana (the Japanese cursive syllabary) character group, the length is determined in such a way as to be large enough to receive the entire amount of light coming from the largest character width which is encountered. The number of the elements of the photoelectric element array is normally four or five, this latter number forming a set, so as to discriminate each of the input patterns, for example 48 hiragana characters (as described in greater detail below in connection with FIG. 4). The width of the photoelectric element array would be extremely small if the cylindrical lens has a small lens aberration in the image-forming direction. However, in view of errors encountered in mechanical installation and in view of influences of diffraction, this width is normally required to be on the order of somewhat more than 2 mm. The entire length of the photoelectric element array is determined in correspondence with the greatest width or the greatest height of the character of the input pattern group consisting for example of numerical figures, Chinese characters and hiraganas. The outputs of the photoelectric element arrays 11 and 12 are amplified by amplifiers 14 and 15, respectively, and are then applied to a quantizing-identifying logic circuit 17 which is illustrated in detail in FIG. 4. As will be apparent from the description which follows, the photosensitive means 11, 14, on the one hand, and 12, 15, on the other hand, thus form electrical signals corresponding to characteristics of a pattern at the read position in a pair of mutually perpendicular directions, and it is these electrical signals which are quantized by the quantizing means of the invention into a binary code capable of identifying a pattern at the read position.

Figure 4:
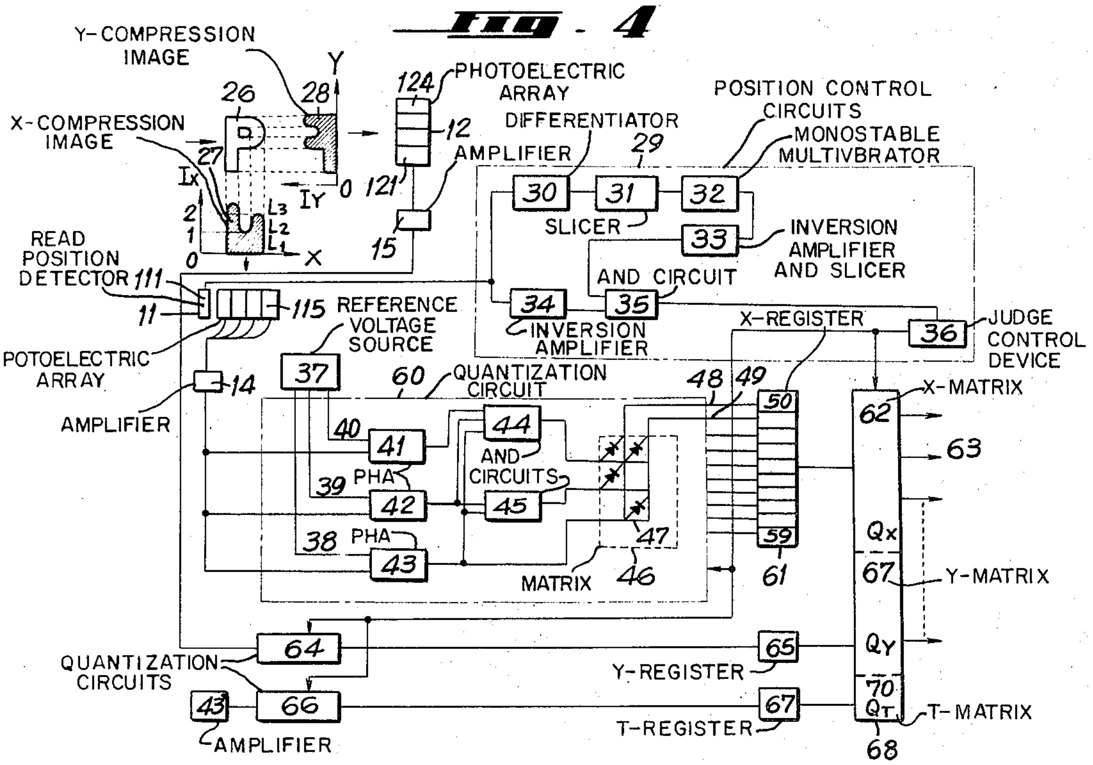
FIG. 4 is a schematic illustration of details of a pattern-identifying logic circuit utilized with the embodiment of FIG. 1, FIG. 4 in particular showing the details of the quantizing-identifying circuit illustrated by the block 17 in FIG. 1.

The pattern carrier film 3, carrying the pattern "P" in the illustrated example, is moved by the positioning means 4 horizontally from left to right, as viewed in FIG. 1, at an approximately constant speed. When the pattern, the character "P" in the illustrated example, reaches a predetermined position, which is the read position where the center of the pattern coincides with the optical axis OA, the light intensity distribution $I_X$ and $I_Y$ of the X-compression image and Y-compression image are respectively as indicated by the distributions 27 and 28 at the upper left of FIG. 4. It is assumed that the light which passes through the pattern at the read position is a pencil of parallel light rays, and the photoelectric element arrays 11 and 12 of the pair of photosensitive means are respectively positioned at the focal planes of the cylindrical lenses 7 and 8, respectively. The circuit 29 of FIG. 4 is arranged for positioning the pattern ("P" in the illustrated example) and for controlling the initiation of the identification process. As the pattern or character "P" in the illustrated example moves from the left toward the right, incident variation in the light amount is caused first at the left-end element 111 of the array 11 (FIG. 4) and then at the next sequential elements in turn. At the Y-array 12, in accordance with the particular configuration of the pattern, the incident light amount variation is received at one or more of the array elements 121—124 illustrated in FIG. 4. In accordance with one of the features of the present invention, the left-end element 111 of the photoelectric element array 11 does not participate in quantization of the X-compression image and is utilized only in connection with controlling the position of the pattern. In other words it is this element 111 which detects when the particular pattern has reached the read position. The width of this left-end element 111 is determined so as to be slightly smaller than the pattern spacing (corresponding to the letter spacing and being constant for printed Chinese characters and kanas).

Figure 5:
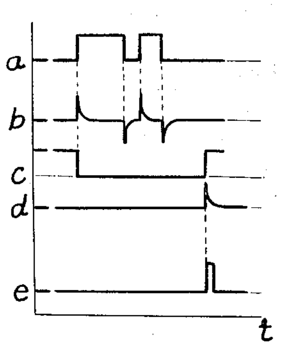
FIG. 5 is a time chart of pulse signals illustrating the operation of a position control circuit of FIG. 4.

The following description is in connection with the position control circuit 29, with reference being made to the pulse waveforms illustrated in FIG. 5.

As the X-compression image of the pattern begins to be received as an input to the photoelectric element 111 from the left, the pulse level of the wave a in FIG. 5 begins to rise. This pattern waveform is differentiated by a differentiation circuit 30 in order to produce the wave *b* illustrated in FIG. 5. A slicer 31 of the circuit 29 produces outputs only with respect to the positive pulses of the pulse series illustrated at the wave *b.* The first one of these positive pulses triggers a monostable multivibrator 32. The width of the negative pulse of the multivibrator 32 (see wave *c* of FIG. 5) corresponds to the duration of time necessary for moving the input pattern carrier 3 of FIG. 1 through a distance slightly greater than the maximum value of the character width of the particular group of characters or patterns carried by the pattern carrier. This pulse *c* output is applied as an input to an inversion amplifier and slicer 33 the output of which is illustrated at the wave *d* in FIG. 5. The pattern waveform of FIG. 5 is inverted by an inversion amplifier 34 and produces pulses of inverse polarity with respect to the wave *a* of FIG. 5. The outputs of the slicer 33 and the inversion amplifier 34 are applied as inputs to an AND circuit 35, and at the instant when a judge initiation pulse is produced as illustrated at wave *e* of FIG. 5, the center of the character P in the illustrated example coincides with the optical axis OA so that no other neighboring pattern or character image is applied simultaneously as an input to the photoelectric element arrays 11 and 12. This result is achieved because the judge duration is determined by the action of the character-width controlling multivibrator 32.

For characters having separated portions or image angles such as "り", "ル", "か", two separate pulses are produced as shown at wave *a* in FIG. 5. However, owing to the action of the multivibrator output pulse *c*, such "separated" character portions are detected as a single character or pattern. The judge initiation pulse e assures through the AND circuit 35 that no other neighboring character has been applied as an input. This pulse *e* is applied as an input to a judge control device 36. The output of the device 36 controls quantization circuits 60, 64 and 66 described below as well as the film positioning means 4 of FIG. 1 so as to indicate the right time of judgment.

Figure 6:
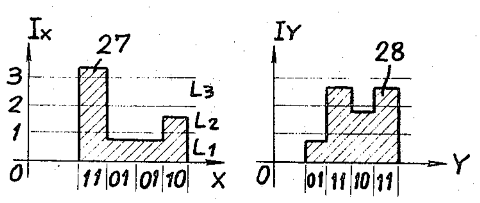
FIG. 6 illustrates light intensity distributions in a pair of mutually perpendicular directions for the letter "P" with reference voltage levels also being illustrated in FIG. 6.

The quantizing means includes a quantizing circuit 60 which operates to quantize the X-compression image of the input pattern "P" in the illustrated example, or more precisely to quantize the corresponding electrical signal provided by the photosensitive means 11, 14. Thus, the output of the amplifier 14 of the photosensitive means is applied, at the instant when the judge pulse *e* is produced, as an input to pulse wave height sorting devices (PHA's) 41, 42 and 43. On the other hand, reference level voltages $L_1$, $L_2$ and $L_3$, as illustrated in FIG. 6, are applied, from a reference voltage source or supply means 37, as inputs in the order of from higher to lower levels to PHA's 41, 42, and 43, respectively. Thus, FIG. 4 illustrates the reference voltage level inputs 40, 39, and 38, respectively supplied by the supply means 37 to the PHA's 41, 42 and 43. Also, FIG. 4 illustrates how the output of the amplifier 14 is delivered to the PHA's 41, 42, and 43. The PHA's 41 and 42 are connected with AND circuits 44 and 45 in the manner illustrated in FIG. 4, and the outputs of these AND circuits as well as the output of PHA 43 pulse-sort the pattern image output into three steps in an order from a higher to a lower level. Thus, the binary code quanta 11, 10, and 01 of the above-mentioned levels are provided by a matrix 46. The three outputs are applied to a quantizing matrix 46 which then provides 2-bit code signal outputs. A plurality of these quantizing circuit 60 are provided, namely, one for each element of the photoelectric array 11. In the illustrated example there are four such elements in the array 11, so that there are four circuits 60 in all, and the quantized code of the X-compression image consists of 8 bits. For example, the quantized code $Q_X$ of the X-compression image of the character "P" is: $Q_X$ = (11010110) as illustrated in FIG. 6. In FIG. 4 the quantization circuit 60 is illustrated for one photoelectric element only, but it is to be understood, as pointed out above, that circuits 60 are respectively provided for the four photoelectric elements of the array 11.

The output of matrix 46, composed of elements such as diodes 47, is transmitted, as shown at 48, 49, for example, to an X-register 61 as an 8-bit code, and in addition by means of an X-matrix 62 there is carried out the operation of recognition or identification by way of comparison with character group information previously written and stored in matrix 62 (in this case 26 letters of the alphabet). The X-matrix 62 may be of the same structure as the matrix 46, and the logic value for pattern identification is represented by 18 bits in all in the order of X-component $Q_X$, Y-component $Q_Y$ and passing-through light component $Q_T$ of the character pattern. Quantization is carried out for the Y-compression image of the character or pattern ("P" in the illustrated example) by way of the amplifier 15 of the photosensitive means which delivers the electrical signal corresponding to the Y-compression image to the Y-quantization circuit 64 of the quantizing means, the output of the circuit 64 being delivered to a Y-register 65. The amount of light passing through the pattern at the read position is delivered from the unit 43', referred to below, in the form of an amplifier, to the T-quantization circuit 66 of the quantizing means, the output of the quantization circuit 66 being delivered to a T-register 67, so that $Q_Y$ and $Q_T$ are respectively provided in this way, the matrix 67 being provided for $Q_Y$ and the matrix 68 being provided for $Q_T$. It will be noted from FIG. 4 that the output of the judge control device 36 which receives its input from the AND circuit 35 is connected with the several quantization circuits 60, 64, and 66 in order to simultaneously set all of the circuits into operation when the end element 111 of the array 11 detects that the pattern which is to be recognized has reached the read position.

The following description is with respect to the significance of the passing-through light component $Q_T$.

Referring again to FIG. 1, the light rays $a_o$ which have passed through the pattern at the read position and which have been reflected by the semi-transparent mirror 5 are received by a light-measuring means formed by a photoelectric element 20 situated at the focus of a converging lens 19, so that the amount of light which passes through a pattern at the read position is transformed photoelectrically into a corresponding electrical signal. The output of the photoelectric element 20 is applied to the amplifier 43' and is then quantized in at least two steps by the above-mentioned quantization circuit 66. The result of this quantization of the amount of light which passes through the pattern is important in two respects. First, it is possible in this way to discriminate between characters which have substantially different amounts of light passing therethrough such as Chinese characters of large image angle and kana characters, as well as the substantially different amounts of light passing through normal characters and punctuation marks, as well as through capital and small letters of the alphabet. In the second place it is possible to discriminate between two characters whose X-compression image and Y-compression image resemble each other closely while the amount of light passing through these characters is substantially different. Such a resemblance may occur in the case of Chinese characters which are of large image angle and are a type of hieroglyphic. Examples of the latter are, however, omitted. Quantization of the amount of light passing through is carried out by way of a process which is entirely identical with the quantization carried out by the circuit 60 described above in connection with FIG. 4, and as a result of the quantization 2-bit codes are provided. In other words a binary code is provided indicating, for example "11" for large letters of the alphabet and "10" for small letters of the alphabet. In correspondence with each level, the memorization addresses of the judge matrix 68 and 67 are classified. Thus, quantization of the amount of light passing through is utilized as an auxiliary means for improving the discrimination ratio of quantization of the X-compression and Y-compression images.

With respect to the quality and installation error of the input patterns, the patterns handled according to the system of the invention are generally in the form of printed or typewritten characters. In connection with pattern identification, there is the question of character splits, character inclination and shift of the center of a character (in X and Y directions). Parallel shift of a character in the X or Y directions can be automatically compensated by the position control circuits 29 and 76 (of FIG. 7 described below). For character splits it is effective to move very slightly the image forming planes 9 and 10 (FIG. 1) out of focus so as to make distributions of X-compression images and Y-compression images continuous. In connection with character inclination, the system of the present invention is effective to the extent that experiments have proved that no error is produced with characters which are inclined within a range of ± 1.5° from the perpendicular line, as is known in connection with magnetic ink character (MICR) standards. For different types of characters such as Gothic characters and Italics of letters of the alphabet, it is desirable to change the memory address of the judge matrix circuit with the different character types.

Figure 2:
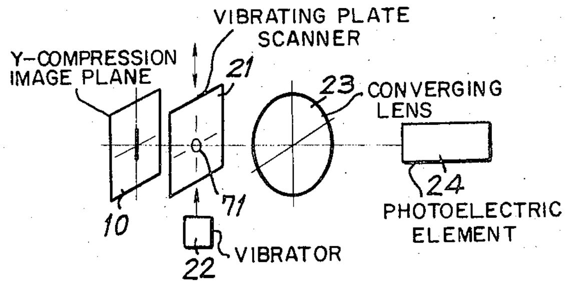
FIG. 2 is a schematic representation of part of a photosensitive pattern-detecting means different from that of FIG. 1.
Figure 7:
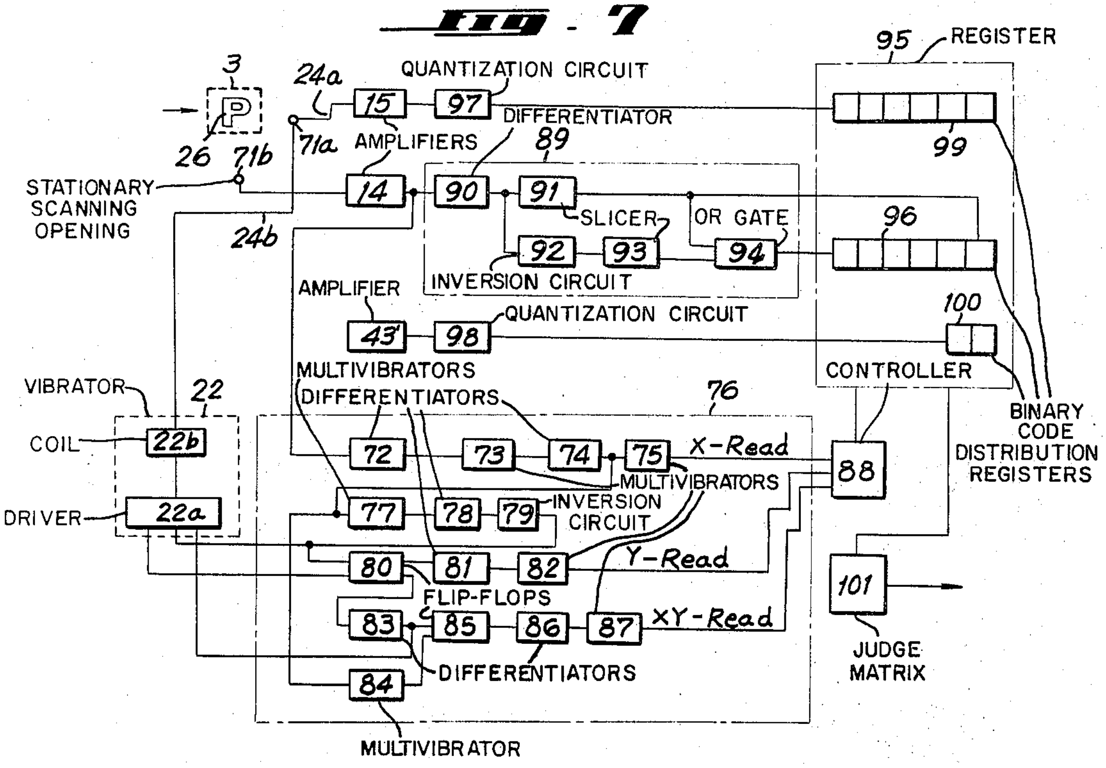
FIG. 7 is a schematic representation of another system according to the invention utilizing the arrangement of FIG. 2.

Referring now to FIGS. 2 and 7, there is illustrated therein another example of the present invention according to which the image in the pair of image planes 9 and 10 is scanned and detected in a different manner in order to achieve the electrical signals which are quantized and which respectively correspond to characteristics of the pattern at the read position in a pair of mutually perpendicular coordinates.

Referring to FIG. 2, there is illustrated therein that part of the scan detection system which scans the Y-compression image. Immediately behind the pattern image-forming plane 10 there is provided a vibrating plate 21 which is formed with a pin hole 71. Thus, this vibrating plate 21 forms a scanning element whch is formed with a scanning opening 71. The plate 21 is driven by a moving means in the form of a driving source 22 which moves the plate 21 so that it carries out a simple harmonic motion of constant amplitude and velocity. The amplitude of this motion is slightly greater than the character height of the input character group and is of a constant value which is not greater than the line spacing in the perpendicular or vertical direction. This scanning element 21 forms part of a photosensitive means which includes the photoelectric element 24 situated at the focus of a converging lens 23 so as to receive the light which passes through the pin hole 71 and convert this light into a corresponding electrical signal. The scan-detecting device for the X-compression image corresponds so that for the Y-compression image except that the driving source or moving means 22 is removed. In other words for the X-compression image there is a scanning plate formed with a scanning opening, but this latter element remains stationary in the region of the image plane 9. In connection with this latter stationary element of the photosensitive means which coacts with the image plane 9, the pin hole 71 is arranged not on the optical axis but at the position of the photoelectric element 111 in FIG. 4, which is to say at the left end of the greatest character width. (It is to be noted that this latter feature is provided only for the purpose of description of the circuit action shown in FIG. 7. The pin hole may be located at the optical axis, if desired. If the pin hole or scanning opening is at the optical axis, then the circuit structure of FIG. 7 is altered partly, and such an embodiment is also possible in practice.)

Referring now to FIG. 7, the photosensitive means used in connection with the X-compression image at the image plane 9 includes not only the stationary scanning plate with the scanning opening but also the amplifier 14 which receives the light which passes through the stationary scanning opening, and the output of the amplifier 14 is applied as an input to a quantization circuit 89 as well as an input to a position control system 76. It is to be noted that in connection with the embodiment of FIGS. 1 and 4, where stationary photoelectric element arrays are used for detecting the characteristics of the image, the photoelectric detection signal is the function of position or location, while in the case of FIGS. 2 and 7 it is the function of time. As the image of the pattern 26 moves from the left into the range where it is received by the pin hole 71*b*, the output of the amplifier 14 produces a rise in the pulse waveform shown at a in FIG. 8. This pulse is differentiated by the differentiator 72 (waveform *b* of FIG. 8), and the first positive pulse triggers a multivibrator 73. The width of the resulting output pulse (waveform c of FIG. 8) and its function are entirely the same as those of the above-mentioned multi-vibrator 32 (FIG. 4). The output of the multivibrator 73 is differentiated by a differentiator 74 (waveform e of FIG. 8) and is then shaped by a multivibrator 75 into an X-compression image read initiation signal (X-read, waveform d of FIG. 8), and it is this signal which is applied to a control device 88. The output of the differentiator 74 also triggers a multivibrator 77 and produces a signal shown at f in FIG. 8. The pulse width of this latter signal is half that of the X-scan control multivibrator 73. This output is differentiated by a differentiator 78, and the break signal of the multivibrator output (waveform *g* of FIG. 8) is shaped into a positive pulse by an inversion circuit 79. This positive pulse turns a flip-flop 80 "on" and at the same time actuates a driving source or moving means 22*a* so as to cause the Y-axis pin hole 71*a* to carry out a simple harmonic motion in the Y direction. This driving a.c. waveform (not illustrated) is a sinusoidal waveform. The driving waveform is shaped into a square wave, as shown at *h* in FIG. 8. The coil 22*b* of the moving means for moving the scanning plate 21 associated with the Y-compression image at the image plane 10 is excited by this driving waveform current so as to cause the vibrating plate 21 shown in FIG. 2 to make simple harmonic motion, utilizing well-known techniques.

Figure 8:
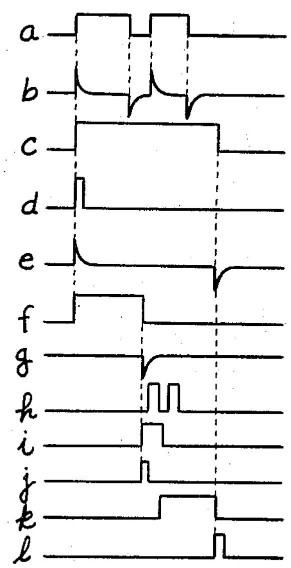
FIG. 8 is a time chart of pulse signals illustrating the operation of a position control system of FIG. 7.

The flip-flop 80 is reset by the first break of the coil exciting waveform, as shown at *h* in FIG. 8, so that an output pulse is produced as illustrated at *i* in FIG. 8. This output waveform *i* is differentiated by a differentiator, and, at the time of breaking of the flip-flop output *i*, inhibits the driving current source output and stops the vibration of the scanning opening 71*a*, so that the simple harmonic motion of the scanning opening has a duration which at a maximum is equal only to one period. The output waveform of the flip-flop 80 is differentiated by a differentiator 81 and the resulting rise signal is shaped by a multivibrator 82 and provides a Y-compression image read initiation signal (Y-read waveform *j* of FIG. 8). Accordingly, the range where a Y-compression image is read is only a half period of the vibration of the scanning opening 71*a*.

It is possible as an alternative to carry out coil excitation continuously and in this case to read the Y-compression image only during the time when the output of the flip-flop 80 (waveform i of FIG. 8) is "on," which is to say to make this output i a Y-read signal. The positive pulse output of a differentiator 83 sets a flip-flop 85, and this is reset by the output of the differentiator 74 through a multivibrator 84, so that the output pulse of this flip-flop has the waveform *k* shown in FIG. 8. The breaking pulse (the output of the differentiator 86) is shaped by a multivibrator 87 and provides a simultaneous judge pulse for the X-compression image and the Y-compression image (waveform 1 of FIG. 8).

In the case of this processing system of FIG. 7, it is necessary that the period of the simple harmonic motion of the scanning opening 71*a* be sufficiently shorter than the input film transport period (the pulse width shown at wave *c* in FIG. 8). The method for eliminating this drawback is to place the scanning opening 71*b* at the left end of the image plane but at the optical axis center. In this manner, it is clear that the X-read signal can function as a read initiation signal which is simultaneous for quantization of the X-signal and Y-signal and thus the units 77, 78 and 79 are not necessary, so that it is possible to simplify the structure and function in this way.

In each case, initiation of character detection is not restricted to any great degree in connection with the X-axis since this is the direction of flim transportation. In other words the moving means 4 moves the pattern carrier 3 in the direction of the X-axis. In connection with the Y-axis, however, the arrangement is made that character detection is initiated precisely at the time when the center of the character or pattern coincides with the optical axis. As described in connection with FIG. 4, it is possible to read a character of two separate image angles, and it is clear that erroneous reading resulting from simultaneous detection of neighboring patterns is not made, which is to say consideration is given to X-direction and Y-direction offsets. The X-read and Y-read signals and the X and Y simultaneous judge signals, which are the outputs of the position control circuit 76, control through the gate of controller 88 the operation of quantization circuit 89 as well as operation of the quantization circuits 97 and 98 for the Y-compression image and the amount of light passing through the pattern, and through the gate of the controller 88 the operation of register 95 is also controlled, this register including the binary code distributions 96, 99, and 100 of the characteristics with respect to the X-direction, the Y-direction, and the amount of light passing through.

Figure 9:
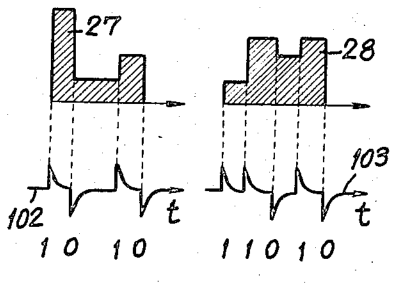
FIG. 9 illustrates compression images in a pair of mutually perpendicular coordinates and the electrical signals and binary code information corresponding thereto.

The operation of the X-quantization circuit is as follows:

The signal output of amplifier 14 corresponding to characteristics of the pattern in the X-direction, is differentiated by a differentiator 90, and the positive pulse is applied to a slicer 91, while the negative pulse is inverted by an inversion circuit 92 and is then applied to a slicer 93. Both pulses are applied as positive pulse inputs to an OR gate 94. The outputs of the OR gate 94 act as shift pulses for the register 96. On the other hand, the positive output pulses of slicer 91 are applied in turn to the lower place of the register 96. The outputs 27 and 28 (FIG. 4) of the X-compression image and Y-compression image of the character pattern "P" in the illustrated example are respectively shown in FIG. 9. Thus, the differentiation waveforms of these outputs are indicated by the waves 102 and 103, and it is clear from the above circuit operation that the information stored in the register is in the form of the binary codes 1010 and 11010, respectively.

Different input patterns may produce a greater number of differentiation waves so that the register is provided with 7 bit places, and the arrangement is made in such a way that by means of X-judge and Y-judge signals there are provided empty shift instructions so as to arrange the bit information from the uppermost place. Accordingly in connection with the character "P", $Q_X = (1010\underline{000})$ and $Q_Y = (1101\underline{000})$. (The underlined portions indicate space bits.) The bit arrangement in the register is in the order of $Q_XQ_YQ_T$, as pointed out above, and the logic value table of the pattern group applied to the judge matrix 101 has an arrangement of entirely the same order as above.

Quantization of the Y-compression image and of the light which passes through the pattern is carried out in the same way as for the X-compression image described above. This quantization is carried out for the Y-compression image through the amplifier 15 of the photosensitive means associated with the Y-compression image, and a quantization circuit 97 and a register 99 are utilized in connection with the Y-compression image. In connection with the amount of light passing through the pattern, the light measuring means includes the amplifier 43' which in turn is connected to the quantization circuit 98, and this latter circuit is connected to the register 100.

In the above description the optical system is capable of discriminating negative types of patterns and two different systems of pattern quantization have been described, one being the stationary parallel processing system of FIGS. 1 and 4 and the other being the scan differentiation processing system of FIGS. 2 and 7. In connection with the optical system, it is to be noted that as the successive input patterns are fluently read in sequence, a neighboring character would come into the field of view of the light reception. For this reason it is desirable to provide a mask plate 200 having a mask 201 immediately before the pattern carrier 3 so as to restrict the field of view of the pencil of light rays. It is also desirable that the width and the height of the rectangular mask correspond to the maximum values of the character width and character height of the particular group of characters which form the patterns carried by the carrier 3, and that masks predetermined in accordance with characteristics of different pattern groups are selected. Such a mask is necessary for the positive type pattern recognition described below.

Figure 3:
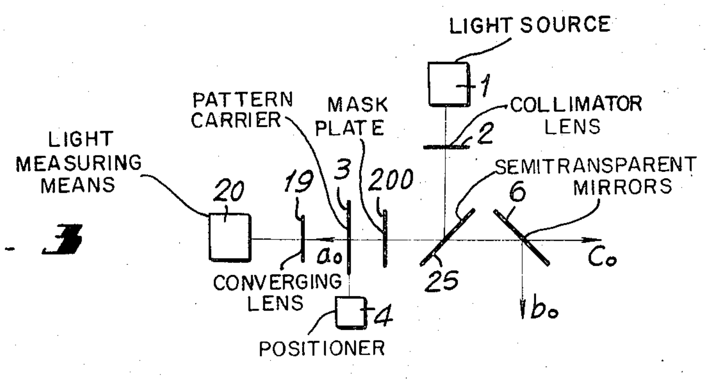
FIG. 3 is a schematic plan view of part of an optical system capable of being used with positive patterns.

FIG. 3 illustrates an illumination system of an optical assembly for handling positive types of patterns. The parts of the optical system not illustrated in FIG. 3 are the same as in FIG. 1 or FIG. 2. Thus, referring to FIG. 3, the light rays from the source 1 are rendered parallel by a collimator lens 2, and are reflected by a semi-transparent mirror 25 so that they pass through the mask 200 and illuminate a pattern on the pattern carrier 3 which is operatively connected with the positioning means 4, in the manner described above. The pattern carrier 3 is in the form of a memory medium such as a sheet of white paper carrying printed or type input characters. The positioning means 4 takes the form of a paper transporting system which may be the same as that of FIG. 1. The light rays which have travelled through the carrier 3 pass through the converging lens 19 and are photoelectrically transformed by the photoelectric element 20 situated at the focal plane of the lens 19, this structure forming part of a light-measuring means for measuring the amount of light passing through a pattern, as pointed out above in connection with FIG. 1. On the other hand, the light rays which are reflected by the pattern carrier 3 return through the semi-transparent mirror 25 and reach the semi-transparent mirror 6 which divides or splits the beam into the X-compression image light rays $b_o$ and Y-compression image light rays $c_o$. Thus, FIG. 3 illustrates a reflection-type of light-detection system. Positive type patterns can be handled also by the transmission-type of light detection system illustrated in FIG. 1. In this case the light-transmission contrast between the black pattern and the white background is important, and in this connection it is effective, instead of directly employing paper carrying printed characters, to improve this contrast by soaking the papers in oil. Generally, the light transmissivity of papers for OCR is for middle-class 60–80 percent and for upper class over 80 percent.

Since the photoelectric detection signals of positive characters are of inversed polarity with respect to negative characters, and a certain amount of d.c. bias is added, it is desirable that the detecting amplifier be of a higher gain and a lower noise than in the case of negative patterns or characters. For a.c. signal processing which is not dependent upon d.c. bias components, the aforementioned scan differentiation type of quantization circuit is more suitable. In any event, it should be noted that the pulse polarity of the quantization circuit is inverted. Furthermore, for the reasons mentioned above, in a positive type of pattern identification, quantization of the amount of light $Q_T$ passing through the pattern is an effective means for improving the discrimination ratio with respect to similar patterns which closesly resemble each other.

Thus, with the present invention there is provided an automatic, rapidly operating pattern-recognizing system which has such advantages that it is more economical than conventional OCR systems. It is far more advantageous than holographic systems, and it is capable of handling both negative and positive types of patterns. It is also possible with the simple optical structure of the invention to carry out in parallel two-dimensional pattern detection simultaneously at all parts of the pattern, which is an important feature of the operation of the optical system of the invention.

What is claimed is:

1. In a pattern recognizing system, image-forming means for forming an image of a pattern which is to be recognized, in each of a pair of image planes, said image-forming means including cylindrical lenses for respectively forming X-compression and Y-compression images in said image planes, said image-forming means having an optical axis, positioning means operatively connected with a pattern carrier for moving the latter across said optical axis for locating patterns, which are carried by said pattern carrier and which are to be recognized, sequentially at a read position extending across the optical axis, a pair of photosensitive means respectively situated in the regions of said planes for responding to an image at said planes and for respectively detecting characteristics of the image in a pair of mutually perpendicular directions and converting said characteristics into a pair of corresponding electrical signals which are respectively indicative of characteristics of the pattern along a pair of mutually perpendicular coordinates, and quantizing means electrically connected with said pair of photosensitive means for quantizing said electrical signals into binary codes capable of identifying the pattern.

2. The combination of claim 1 and wherein a light measuring means is optically arranged with respect to said image-forming means for responding to the quantity of light associated with a pattern at said read position for providing an electrical signal corresponding to said quantity of light, said quantizing means also being electrically connected with said light-measuring means for providing additional binary code information for further identification of a pattern at said read position.

3. The combination of claim 1 wherein said positioning means moves said pattern carrier across the optical axis in a direction which is the same as one of said mutually perpendicular directions in which image characteristics are detected by one of said photosensitive means, said one photosensitive means detecting when a pattern is at said read position and being operatively connected with the other of said photosensitive means for initiating operation of the other of said photosensitive means when a pattern is at the read position.

4. The combination of claim 1 and wherein said pair of photosensitive means each includes an array of photoelectric elements arranged in a row, and said rows of photoelectric elements respectively extending in said mutually perpendicular directions.

5. The combination of claim 1 and wherein said pair of photosensitive means include a pair of scanning elements respectively formed with scanning openings, one of said elements being stationary and scanning an image at the image plane in the region of said one scanning element in response to movement of the pattern carrier in a given direction by said positioning means, and moving means operatively connected to the other of said scanning elements for moving the latter in a direction which is perpendicular to said given direction.

6. The combination of claim 5 and wherein said pair of photosensitive means respectively further include photoelectric elements situated behind said scanning elements for responding to light passing through said scanning openings, respectively, said photoelectric element which is situated behind said stationary scanning element detecting when a pattern reaches the read position and being electrically connected with said moving means for setting the latter into operation when a pattern reaches the read position.

7. The combination of claim 4 and wherein one of said arrays of photoelectric elements extends in the same direction as that in which the pattern carrier is moved by said positioning means and includes at one end of said array a position-detecting photoelectric element which detects when a pattern reaches the read position and which then initiates operation of said arrays of photoelectric elements.

8. The combination of claim 1 and wherein said image-forming means coacts with positive patterns on a negative background of said carrier for providing images of a pattern respectively at said image planes.

9. The combination of claim 1 and wherein said image-forming means coacts with negative patterns on a positive background for forming said image at said image planes.

10. The combination of claim 1 and wherein said pair of photosensitive means respectively operate simultaneously for simultaneously achieving said electrical signals corresponding to the characteristics of a pattern image in a pair of mutually perpendicular directions.

11. The combination of claim 4 and wherein reference voltage supply means cooperates with said pair of photosensitive means for supplying a plurality of reference voltage levels thereto to achieve said signals by comparison with said reference voltage levels.

12. The combination of claim 5 and wherein said moving means is actuated by the photoelectric element coacting with said stationary scanning element to carry out a single harmonic sinusoidal cycle in said perpendicular direction.

* * * * *